(12) United States Patent
Sallam

(10) Patent No.: US 8,285,958 B1
(45) Date of Patent: Oct. 9, 2012

(54) SYSTEM, METHOD, AND COMPUTER PROGRAM PRODUCT FOR COPYING A MODIFIED PAGE TABLE ENTRY TO A TRANSLATION LOOK ASIDE BUFFER

(75) Inventor: Ahmed Said Sallam, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 802 days.

(21) Appl. No.: 11/837,275

(22) Filed: Aug. 10, 2007

(51) Int. Cl.
*G06F 12/00* (2006.01)
(52) U.S. Cl. ............................ 711/165; 711/205; 726/24
(58) Field of Classification Search .................... 726/24; 711/165, 205
See application file for complete search history.

(56) References Cited

U.S. PATENT DOCUMENTS

| | | | | |
|---|---|---|---|---|
| 5,812,848 A * | 9/1998 | Cohen | ............................ | 719/331 |
| 6,463,583 B1 * | 10/2002 | Hammond | ................... | 717/162 |
| 6,779,176 B1 * | 8/2004 | Chambers et al. | ............ | 717/169 |
| 6,854,046 B1 * | 2/2005 | Evans et al. | ................... | 711/203 |
| 6,948,164 B2 * | 9/2005 | Tinker | ............................ | 717/168 |
| 7,047,520 B2 | 5/2006 | Moore et al. | .................. | 717/129 |
| 7,065,617 B2 | 6/2006 | Wang | ............................ | 711/159 |
| 7,069,442 B2 * | 6/2006 | Sutton et al. | .................. | 713/179 |
| 2002/0002667 A1 * | 1/2002 | Kelsey et al. | ................. | 712/228 |
| 2003/0014667 A1 | 1/2003 | Kolichtchak | .................. | 713/201 |
| 2004/0068679 A1 | 4/2004 | Vellolil et al. | .................. | 714/42 |
| 2004/0117793 A1 * | 6/2004 | Shaylor | .......................... | 718/100 |
| 2004/0268084 A1 * | 12/2004 | Longerbeam et al. | ........ | 711/206 |
| 2006/0059486 A1 * | 3/2006 | Loh et al. | ....................... | 718/100 |
| 2006/0129794 A1 * | 6/2006 | Rudelic | .............................. | 713/2 |
| 2006/0161985 A1 * | 7/2006 | Zhao | ............................... | 726/24 |
| 2006/0259732 A1 | 11/2006 | Traut et al. | ..................... | 711/173 |
| 2008/0104130 A1 | 5/2008 | Sallam | .......................... | 707/200 |
| 2008/0109906 A1 | 5/2008 | Sallam | .............................. | 726/24 |
| 2008/0127344 A1 | 5/2008 | Sallam | .............................. | 726/23 |
| 2008/0140897 A1 * | 6/2008 | Ganguly | ........................ | 710/268 |
| 2008/0141266 A1 * | 6/2008 | Hunt et al. | ..................... | 718/106 |

OTHER PUBLICATIONS

Erdelyi, Gergely, (2004), Hide 'n' Seek? Anatomy of Stealth Malware, Proceedings of the 2004 black Hat Europe, pp. 147-167.*
"Patching Policy for x64-Based Systems," Microsoft Corporation, Jan. 22, 2007, http://www.microsoft.com/whdc/driver/kernel/64bitpatching.mspx.

* cited by examiner

*Primary Examiner* — Matthew Bradley
(74) *Attorney, Agent, or Firm* — Patent Capital Group

(57) ABSTRACT

A system, method, and computer program product are provided for copying a modified page table entry to a translation look aside buffer. In use, a page table entry corresponding to an original page associated with original code is identified. In addition, a page mapping in a translation look aside buffer is invalidated by calling a processor instruction that invalidates the page mapping. Further, the page table entry is modified to correspond to a different page associated with different code. Still yet, an instruction of the different code is accessed for prompting a processor to copy the modified page table entry to the translation look aside buffer. Moreover, the modified page table entry is restored to correspond to the original page associated with the original code.

24 Claims, 5 Drawing Sheets

SYSTEM, METHOD, AND COMPUTER PROGRAM PRODUCT FOR COPYING A MODIFIED PAGE TABLE ENTRY TO A TRANSLATION LOOK ASIDE BUFFER

FIELD OF THE INVENTION

The present invention relates to virtual memory, and more particularly to virtual memory implementations that utilize paging.

BACKGROUND

In some virtual memory systems, paging is used for implementing virtual memory. Generally, such paging has included indirectly mapping virtual address space to physical memory. However, such virtual memory systems have been associated with various limitations. For example, a number of operating systems have begun utilizing code accessed utilizing virtual memory for preventing access to kernels of such operating systems. With respect to such example, third party security systems which rely on access to the kernels for security purposes have been prevented from gaining such access.

There is thus a need for addressing these and/or other issues associated with the prior art.

SUMMARY

A system, method, and computer program product are provided for copying a modified page table entry to a translation look aside buffer. In use, a page table entry corresponding to an original page associated with original code is identified. In addition, a page mapping in a translation look aside buffer is invalidated by calling a processor instruction that invalidates the page mapping. Further, the page table entry is modified to correspond to a different page associated with different code. Still yet, an instruction of the different code is accessed for prompting a processor to copy the modified page table entry to the translation look aside buffer. Moreover, the modified page table entry is restored to correspond to the original page associated with the original code.

DETAILED DESCRIPTION

Figure 1:
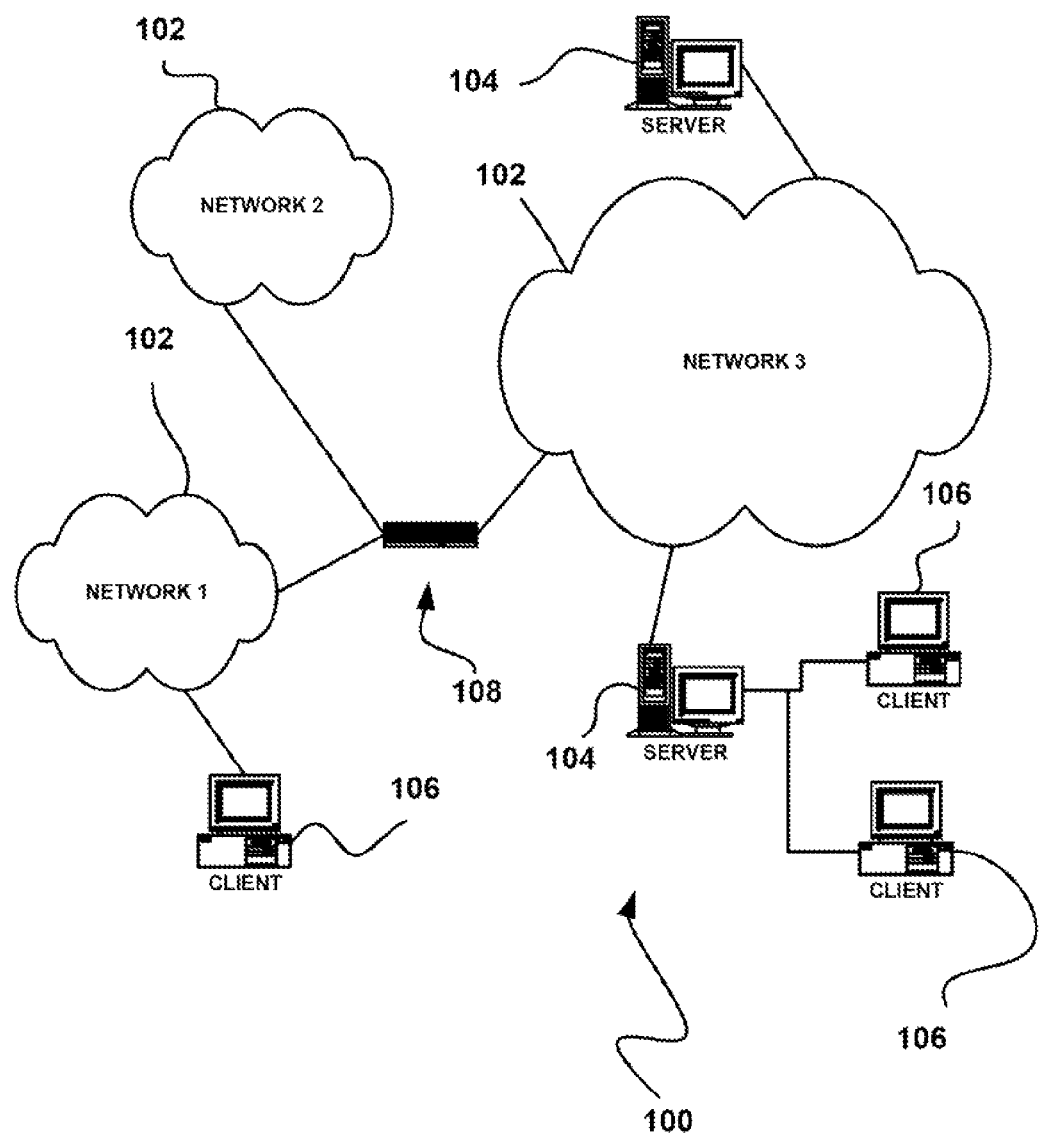
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer etc.), any component of a computer, and or any other type of logic. In order to facilitate communication among the networks 102, at least one gateway 108 is optionally coupled therebetween.

Figure 2:
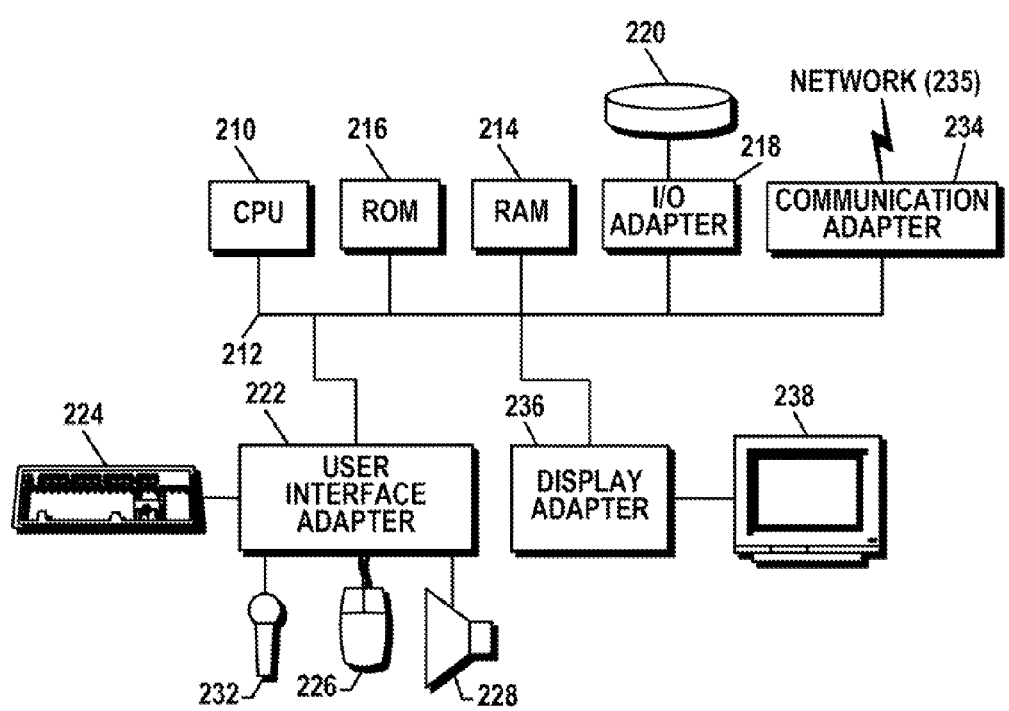
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
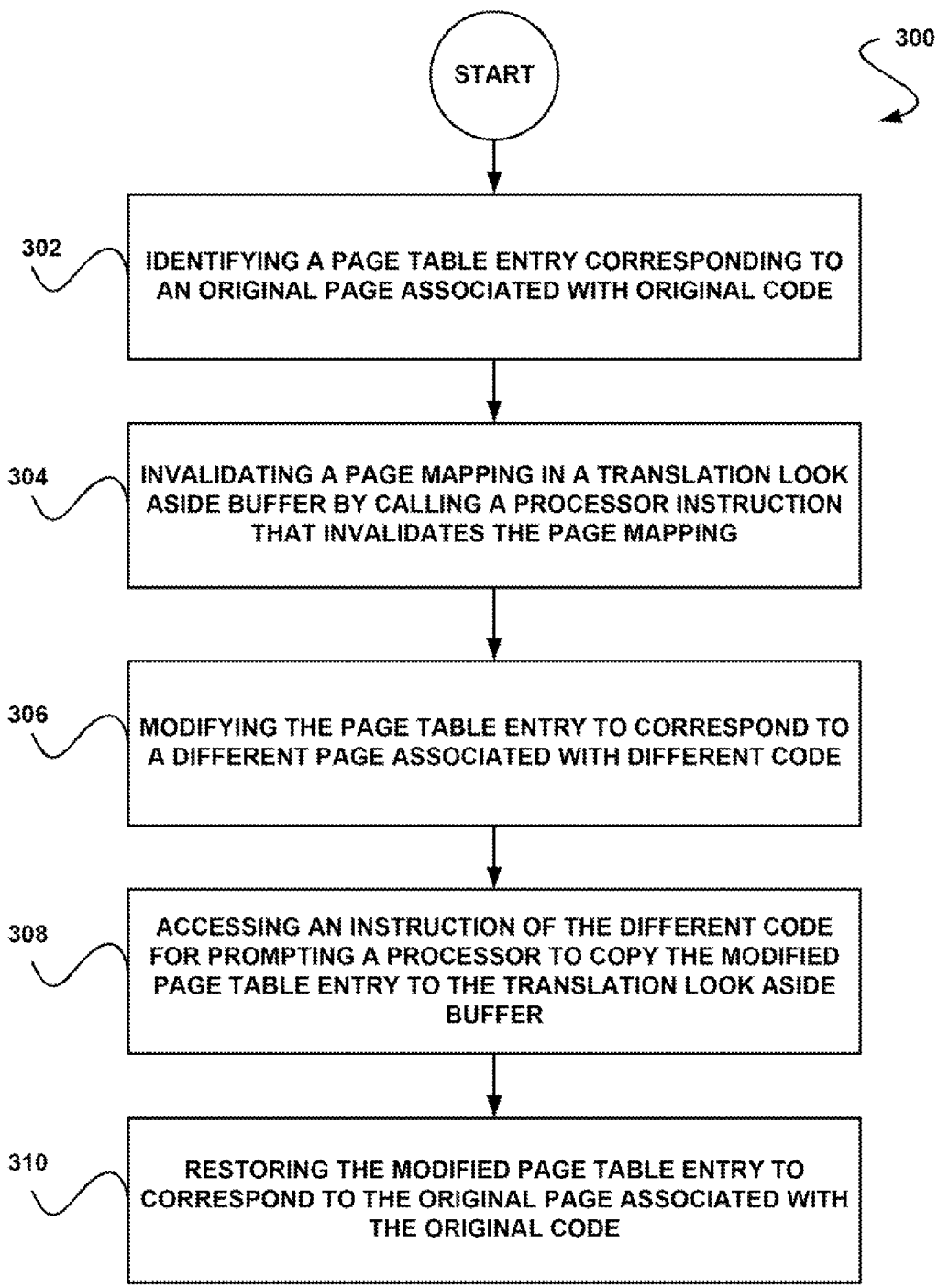
FIG. 3 shows a method for copying a modified page table entry to a translation look aside buffer, in accordance with one embodiment.

FIG. 3 shows a method 300 for copying a modified page table entry to a translation look aside buffer, in accordance with one embodiment. As an option, the method 300 may be carried out in the context of the architecture and environment of FIGS. 1 and/or 2. Of course, however, the method 300 may be carried out in any desired environment.

As shown in operation 302, a page table entry corresponding to an original page associated with original code is identified. In the context of the present description, the original code may include any code (e.g. computer code, etc.) capable of being associated with a page corresponding to a page table entry. Further, the original code may include a program (e.g. process, etc.) capable of being executed.

In one embodiment, the original code may include code for preventing access (e.g. modifications, etc.) to a kernel of an operating system. Such access may be prevented only with respect to unauthorized applications. Additionally, in such embodiment, the original code may be provided by an operating system provider.

Just by way of example, the original code may include kernel patch protection. The kernel patch protection may prevent kernel-mode drivers from extending or replacing operating system kernel services, and may prohibit applications from performing unsupported patches in the kernel. The kernel patch protection may be utilized for improving security of a device associated with the operating system kernel, for example, by preventing unwanted modifications to the kernel for malicious purposes. In addition, the kernel patch protection may also prevent applications from making unauthorized or unsupported modifications to operating system data structures e.g. interrupt dispatch table, etc.).

To this end, the original code may be stored in memory of a device. Such device may include any of the devices described above with respect to FIGS. 1 and/or 2, for example. In one embodiment, the original code may be stored in physical memory of the device, such as, for example, RAM. Further, the original code may be accessed indirectly utilizing paging. For example, the original code may be accessed utilizing virtual memory.

Further, the original page associated with the original code may include a portion of linear (e.g., virtual) address space, in one embodiment. Such original page may thus be mapped to a location in physical memory in which the original code is stored. As an option, the original page may be a fixed size (e.g. 4 kilobytes, 2 megabytes, 4 megabytes, etc.). Just by way of example, a processor may divide the linear address space into a plurality of fixed size pages, where each of the pages is mapped to physical memory.

Still yet, in the context of the present description, the page table entry that corresponds to the original page may include any entry in a page table. In various exemplary embodiments, such page table may include any data structure with a plurality of entries corresponding to various pages. In one embodiment, the page table entry may point to the original page.

Optionally, the page table entry may be identified utilizing a linear address. Just by way of example, in an embodiment where the original page is 4 kilobytes in size, bits 22-31 of the linear address may provide an offset which indicates an entry in a page directory. Such indicated page directory entry may specify a particular page table (e.g. may point to a base physical address of the page table, etc.).

Furthermore, bits 12 through 21 of the linear address may provide an offset to the page table entry in the specified page table. In addition, the page table entry may specify the base physical address of the original page in physical memory. Of course, it should be noted that the page table entry may be identified in any desired manner.

With continuing reference to FIG. 3, a page mapping in a translation look aside buffer is invalidated by calling a processor instruction that invalidates the page mapping, as shown in operation 304. The translation look aside buffer may include a cache (e.g. of a processor), in one embodiment. In another embodiment, the translation look aside buffer may include an instruction translation look aside buffer.

In yet another embodiment, the translation look aside buffer may store a predetermined number of the most recently accessed page table entries (and optionally page directory entries). To this end, the translation look aside buffer may optionally be utilized to satisfy requests for pages associated with page table entries stored therein. The translation look aside buffer may therefore allow an amount of time utilized for accessing memory to be decreased, for example, by reducing a number of memory accesses utilized.

In one embodiment, the page mapping, in the translation look aside buffer may be associated with a page table entry in the translation look aside buffer. For example, the page mapping may include a mapping of the identified page table entry to the original page. To this end, invalidating the page mapping in the translation look aside buffer may include invalidating (e.g. removing, etc.) a page table entry in the translation look aside buffer that corresponds to the original page. It should be noted that the processor instruction that invalidates the page mapping may include any instruction capable of being performed by a processor for invaliding the page mapping.

Moreover, the page table entry is modified to correspond to a different page associated with different code, as shown in operation 306. In the context of the present description, the different code may include any code that is different from the original code. In one embodiment, the different code may include code for accessing (e.g. modifying) the kernel of the operating system. In another embodiment, the different code may be utilized for patching the kernel of the operating system, such that profiling sensors, policy enforcement points, etc. may be installed inside the kernel of the operating system for securing a system (e.g. device, etc.) from unwanted code (e.g. viruses, vulnerability exploitations, buffer overflow exploitations, remote code injections, etc.). Accordingly, the different code may optionally be provided by a security system provider.

In addition, the different code may be stored in memory of the device in which the original code is stored. For example, the different code may be stored in physical memory of the device, such as, for example, RAM. Further, the original code may be accessed indirectly utilizing paging, virtual memory, etc.

Further, the different page associated with the different code may include a portion of linear (e.g. virtual) address space, in one embodiment. Such different page may thus be mapped to a location in physical memory in which the different code is stored. In one embodiment, the page table entry may be modified in the page table. For instance, the page table entry may be modified such that the page table entry points to the different page. Thus, the modified page table entry may be mapped to the different page associated with the different code. To this end, the modified page table entry may indicate a location of the different page associated with the different code.

In this way, modifying the page table entry to correspond to the different page associated with the different code may prevent execution of the original, code. For example, in one embodiment where the original code includes code for preventing modification to the kernel of the operation system, modifying the page table entry may enable modification of the kernel of the operating system (e.g. for security purposes, etc.).

As also shown, an instruction of the different code is accessed for prompting a processor to copy the modified pave table entry to the translation look aside buffer. Note operation 308. In the context of the present description, the instruction may include any code within the different code. For example, the instruction may include a function (e.g. dummy function, etc.).

Furthermore, accessing the instruction of the different code may include calling the instruction (e.g. from within another application, manually, etc.). In one embodiment, copying the modified page table entry to the translation look aside buffer may allow a page table entry in the translation look aside buffer point to the different page. Thus, by accessing the different code, a page mapping associated with the different page may be inserted in the translation look aside buffer.

To this end, in one embodiment, copying the modified page table entry to the translation look aside buffer may optionally allow the different code to execute in response to access of the page table entry in the translation look aside buffer, such that the original code may optionally be prevented from executing. For example, utilization of the translation look aside buffer may allow the original code to be disabled. As an option, in an embodiment where the original code precludes security operations (e.g. where the original code prevents modification by security systems of the kernel of the operating system), the original code may be prevented from precluding the security operations by preventing execution (of the original code).

Still yet, the modified page table entry is restored such that the page table entry corresponds to the original page associated with the original code, as shown in operation 310. It should be noted that the page table entry may be restored in any desired manner. For example, the page table entry may be restored by modifying the page table entry in the page table to point to the original page associated with the original code. Accordingly, the page table entry in the page table may correspond with the original page associated with the original code, while the page mapping in the translation look aside buffer maps the page table entry therein to the different page associated with the different code.

Restoring the page table entry may optionally allow the operating system to perform as expected, such as, for example, when validating the pave table entry in the page table. In this way, stability and performance of the operating system may be maintained. Just by way of example, errors associated with the operating system may be eliminated that may otherwise arise due to the modified page table entry described above.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
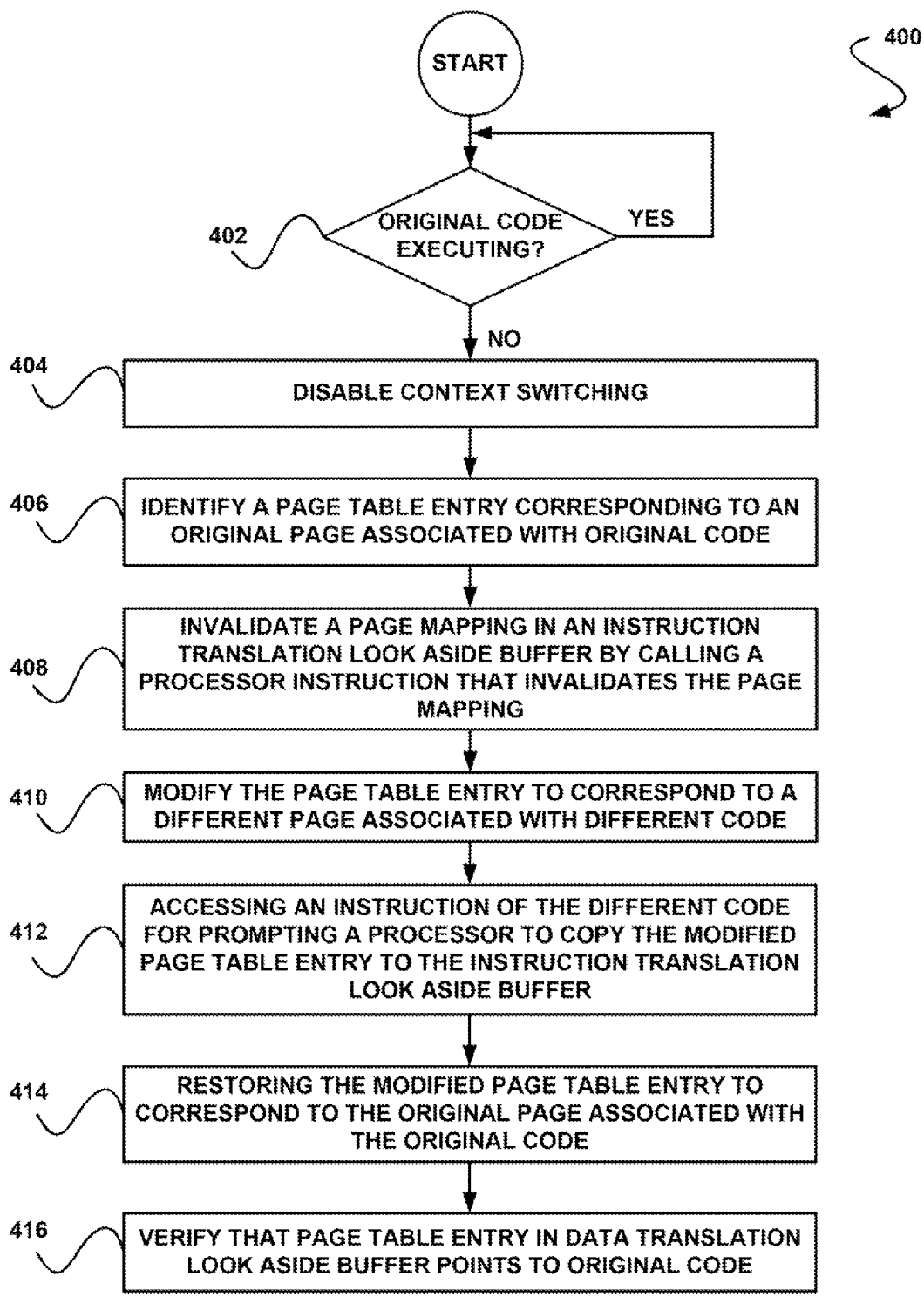
FIG. 4 shows a method for determining when to copy a modified page table entry to a translation look aside buffer, in accordance with another embodiment.

FIG. 4 shows a method 400 for determining when to copy a modified page table entry to a translation look aside buffer, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 402, it is determined whether original code is executing. Determining whether the original code is executing may include determining whether the original code is in the process of being executed, including, for example, during context switching (e.g. context swapping). In one embodiment, the determination may include determining whether a thread of the original code is executing. For example, the thread may be utilized for executing the original code. Such thread may include any process capable of being performed by a processor.

In one embodiment, it may be determined whether the original code is executing by identifying all threads in the process of being executed by the processor (e.g. via context switching, etc.). Further, for each identified thread, code executed utilizing such threads may be identified. Moreover, the identified code may be compared with the original code (e.g. utilizing a location of the original code) for determining whether the original code is executing.

If it is determined that the original code is executing, execution of the original code is allowed to proceed. Thus, interruption of the execution of the original code may be prevented. However, in response to a determination that the original code is not executing, context switching is disabled. Note operation 404. It should be noted that the context switching may be disabled in any desired manner.

In one embodiment, the context switching may be disabled by controlling a thread scheduler of the processor. In another embodiment, the context switching may be disabled by controlling an interrupt service routine. In yet another embodiment, the context switching may be disabled by hooking the context switching.

In still yet another embodiment, the context switching may be disabled by raising an interrupt request level (IRQL) to a level that disables context switching. Optionally, the context switching may be disabled only with respect to the original code, such that context switching may be allowed for any code that does not include the original code. Thus, the original code may be prevented from executing.

To this end, a process (e.g. scheduler, interrupt service routine, etc.) utilized for executing the original code may be controlled, based on the determination (decision 402). For example, as described in the present embodiment, the process may be controlled by disabling context switching. Of course, however, the process may be controlled in any desired manner. In this way, the original code may be prevented from executing in response to a determination that the original code is not already executing.

Once the context switching is disabled, operation similar to that of FIG. 3 may be carried out. Specifically, as shown, a page table entry corresponding to an original page associated with original code is identified. Note operation 406. In addition, a page mapping in an instruction translation look aside buffer is invalidated by calling a processor instruction that invalidates the page mapping, as shown in operation 408. Further, the page table entry is modified to correspond to a different page associated with different code, as in operation 410. Still yet, an instruction of the different, code is accessed for prompting a processor to copy the modified page table entry to the instruction translation look aside buffer. Note operation 412. Moreover, the modified page table entry is restored to correspond to the original page associated with the original code, as shown in operation 414.

As also shown, it is verified that a page table entry in a data translation look aside buffer points to the original code (operation 416). Such data translation look aside buffer may include page table entries that are mapped to data pages associated with data. For example, the data may include any information processed by code (e.g. instructions).

Thus, it may be verified that a page table entry in the data translation look aside buffer points to data in the original code. Such verification may ensure that any attempt by the operating system to read the data in the original code will result in a read of the original code pages.

Optionally, the identification of the page table entry (operation 406), the invalidation of the page mapping (operation 408), the modification of the page table entry (operation 410), the accessing of the instruction (operation 410), the restoring of the modified pate table entry (operation 414), and/or the verification of the page table entry in the data translation look aside buffer (operation 416) may be performed with respect to any desired operating system, since such functionality may not necessarily utilize facilities or functionality of an operating system.

As a further option, operations 406 to 414 may also be implemented in conjunction with a hook that maybe utilized for disabling the context switching (as described as one embodiment above with respect to operation 404). For example, a page table entry in a page table that corresponds to a context switching code page may be modified to point, to another page. In one exemplary embodiment, such other page may include the context switching code of the context switching code page, in addition to an inline hook.

In one exemplary embodiment, an application (e.g. computer program) may reference a logical address in memory for accessing the different code. The processor may translate the logical address into a linear address, and utilize paging to translate the linear address into a corresponding physical address. The translation may be performed utilizing information contained in page directories and page tables stored in memory for mapping the linear address into the physical address space.

In performing the translation, a translation look aside buffer may be utilized. In particular, a page table entry corresponding to the different page associated with different code may be included in the translation look aside buffer, such that the processor may utilize such page table entry for accessing the different code. As an option, the translation look aside buffer may be utilized to minimize the number of bus cycles utilized during the address translation. For example, the translation look aside buffers may satisfy requests for reading page directory and page tables without requiring a bus cycle.

If the different page containing the linear address is not currently in physical memory, the processor may generate a page-fault exception (#PF). It may be determined whether the different page is currently in memory utilizing a flag. In one embodiment, the operating system may maintain the state of the flag. If the processor generates a page-fault exception, the operating system may carry out the following operations: (1) copy the different page from disk storage into physical memory; (2) load the page address into the page-table or page-directory entry and set the flag (optionally, other flags, such as the dirty and accessed flags, may also be set at this time); (3) invalidate the current page-table entry in the translation look aside buffer; and (4) return from an exception handler to restart the interrupted program.

The exception handler for the page-limit exception may direct the operating system, for example, to load the page from disk storage into physical memory. Optionally, the exception handler may also write a different page from physical memory out to the disk storage in the process. When the different page has been loaded in physical memory, a return from the exception handler may cause the instruction that generated the exception to be restarted. In this way, the different code may be accessed via the translation look aside buffer.

Figure 5:
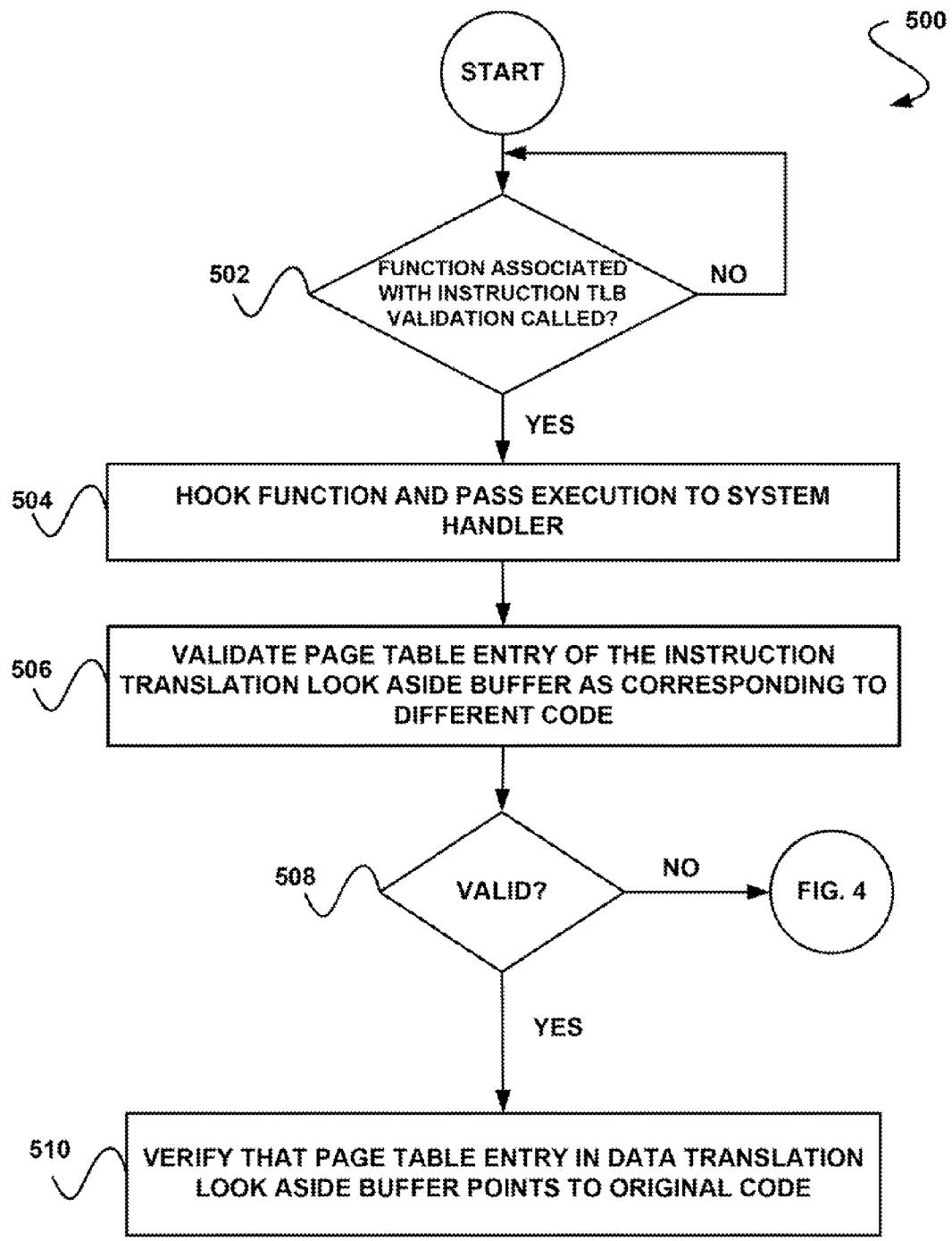
FIG. 5 shows a method for validating a page table entry in an instruction translation look aside buffer, in accordance with yet another embodiment.

FIG. 5 show a method 500 for validating a page table entry in an instruction translation look aside buffer, in accordance with yet another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

Initially, it is determined whether a function associated with an instruction translation look aside buffer validation has been called, as shown in decision 502. In the context of the present embodiment, the instruction translation look aside buffer validation may include any process in which page table entries of the instruction translation look aside buffer may be modified. For example, such modification may include modifying a page mapping associated with a page table entry of the instruction translation look aside buffer.

In addition, the function may include any function capable of being called that may initiate the instruction translation look aside buffer validation. Optionally, such function may be called manually or automatically (e.g. via an application, etc.). Just by way of example, the function may include a function via which context switching is performed by a processor (e.g. KiSwapContext, etc.). As another example, the function may include an instruction (mov cr3, val).

In response to a determination that the function has been called, the function is hooked and execution is passed to a system handler, as shown in operation 504. It should be noted that the function may be hooked in any desired manner. For example, in one embodiment, the function may be hooked utilizing an inline hook of the function.

Additionally, execution may be passed to the system handler at any time with respect to the called function. For example, the execution may be passed to the system handler after execution of the function, in one embodiment. In this way, any modifications made to the page table entries of the instruction translation look aside buffer as a result of the function may be identified. Optionally, the system handler may be provided by a security system provider.

Further, as shown in operation 506, a page table entry of the instruction translation look aside buffer is validated as corresponding to different code. In one embodiment, the validation may be based on a determination of whether a page table entry previously corresponding to original code currently corresponds to the different code. In another embodiment, the validation may be based on a determination of whether any page table entries correspond to the different code. In yet another embodiment, the validation may be based on a determination of whether any page table entries correspond to the original code. Of course, however, the page table entry of the instruction translation look aside buffer may be validated as corresponding to different code in any manner.

Thus, it is determined whether the page table entry corresponds to the different code, as shown in decision 508. If it is determined that the page table entry does correspond to the different code, it is further verified that a page table entry in a data translation look aside buffer points to the original code. For example, it may be verified that a page table entry in the data translation look aside buffer points to data in the original code. Such verification may ensure that any attempt by an operating system to read the data in the original code will result in a read of the original code pages.

If however, it is determined that the page table entry does not correspond to the different code, the page table entry in the page table is modified such that a copy of the modified page table entry may be copied to the instruction translation look aside buffer (see operations of FIG. 4). In this way, it may be ensured that a page table entry of the instruction translation look aside buffer corresponds to the different code.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a page table entry corresponding to an original page associated with original code associated with kernel protection for a computer;
   invaliding a page mapping in an instruction translation look aside buffer by calling a processor instruction that invalidates the page mapping;
   modifying the page table entry to correspond to a different page associated with different code;
   accessing an instruction of the different code for copying the modified page table entry;

restoring the modified page table entry to correspond to the original page associated with the original code; and verifying that the modified page table entry in a data translation look aside buffer points to the original code.

2. The method of claim 1, wherein the original code includes code for preventing access to a kernel of an operating system.

3. The method of claim 1, wherein the original code includes code for preventing modifications to a kernel of an operating system.

4. The method of claim 1, wherein the identified page table entry points to the original page.

5. The method of claim 1, wherein invalidating the page mapping in the instruction translation look aside buffer includes invaliding an entry in the instruction translation look aside buffer associated with the original page.

6. The method of claim 1, wherein invalidating the page mapping in the instruction translation look aside buffer includes removing an entry in the instruction translation look aside buffer associated with the original page.

7. The method of claim 1, wherein the different code includes code for modifying a kernel of an operating system.

8. The method of claim 1, wherein the different code is utilized for securing a system.

9. The method of claim 1, wherein the different code is provided by a security system provider.

10. The method of claim 1, wherein the modified page table entry points to the different page.

11. The method of claim 1, wherein copying the modified page table entry to the instruction translation look aside buffer prevents the original code from precluding security operations.

12. The method of claim 1, further comprising determining whether the original code is executing.

13. The method of claim 12, wherein the determination is made by determining whether a thread of the original code is executing.

14. The method of claim 12, further comprising controlling a process utilized for executing the original code, based on the determination.

15. The method of claim 14, wherein the process includes a scheduler.

16. The method of claim 14, wherein the process includes an interrupt service routine.

17. The method of claim 14, wherein the process is controlled by disabling context switching.

18. The method of claim 1, wherein the different code is utilized for patching a kernel of an operating system, such that profiling sensors and policy enforcement points are installed inside the kernel of the operating system.

19. The method of claim 1, wherein the instruction of the different code includes a dummy function.

20. The method of claim 7, wherein the verifying ensures that an attempt by an operating system to read data in the original code results in a read of the original page associated with original code.

21. The method of claim 1, wherein the page table entry of the instruction translation look aside buffer is validated as corresponding to the different code, the validation based on a determination of whether the page table entry previously corresponding to original code currently corresponds to the different code.

22. A computer program product embodied on a non-transitory computer readable medium for performing operations, comprising:

identifying a page table entry corresponding to an original page associated with original code associated with kernel protection for a computer;

invaliding a page mapping in an instruction translation look aside buffer by calling a processor instruction that invalidates the page mapping;

modifying the page table entry to correspond to a different page associated with different code;

accessing an instruction of the different code for copying the modified page table entry;

restoring the modified page table entry to correspond to the original page associated with the original code; and verifying that the modified page table entry in a data translation look aside buffer points to the original code.

23. A system, comprising:

a processor coupled to a memory such that the system is configured for:

identifying a page table entry corresponding to an original page associated with original code associated with kernel protection for a computer, invaliding a page mapping in an instruction translation look aside buffer by calling a processor instruction that invalidates the page mapping, modifying the page table entry to correspond to a different page associated with different code, accessing an instruction of the different code for copying the modified page table entry, restoring the modified page table entry to correspond to the original page associated with the original code, and verifying that the modified page table entry in a data translation look aside buffer points to the original code.

24. The system of claim 23, wherein the processor is coupled to the memory via a bus.

* * * * *